United States Patent
Tan et al.

(10) Patent No.: US 11,947,868 B2
(45) Date of Patent: Apr. 2, 2024

(54) METHOD TO MUTE AND UNMUTE A MICROPHONE SIGNAL

(71) Applicant: Creative Technology Ltd, Singapore (SG)

(72) Inventors: Kee Seng Tan, Singapore (SG); Luen Kai Chan, Singapore (SG); Ariel Arellano De Castro, Singapore (SG)

(73) Assignee: CREATIVE TECHNOLOGY LTD., Singapore (SG)

( * ) Notice: Subject to any disclaimer, the term of this patent is extended or adjusted under 35 U.S.C. 154(b) by 282 days.

(21) Appl. No.: 17/564,196

(22) Filed: Dec. 28, 2021

(65) Prior Publication Data

US 2022/0206739 A1    Jun. 30, 2022

Related U.S. Application Data

(60) Provisional application No. 63/131,424, filed on Dec. 29, 2020.

(51) Int. Cl.
*G06F 3/16* (2006.01)
*G10L 21/034* (2013.01)

(52) U.S. Cl.
CPC ............ *G06F 3/165* (2013.01); *G10L 21/034* (2013.01)

(58) Field of Classification Search
CPC ................................ G06F 3/165; G10L 21/034
See application file for complete search history.

(56) References Cited

U.S. PATENT DOCUMENTS

| | | | |
|---|---|---|---|
| 5,991,718 A * | 11/1999 | Malah | G10L 25/78 704/214 |
| 8,903,721 B1 | 12/2014 | Cowan | |
| 2005/0014535 A1 * | 1/2005 | Desai | H04M 9/082 455/345 |
| 2010/0324891 A1 | 12/2010 | Cutler | |
| 2011/0264447 A1 * | 10/2011 | Visser | G10L 25/78 704/208 |
| 2014/0126734 A1 | 5/2014 | Gauger, Jr. et al. | |

FOREIGN PATENT DOCUMENTS

EP    3188495    7/2017

OTHER PUBLICATIONS

EPO; European Search Report dated May 25, 2022 in Application No. 21212938.1.

* cited by examiner

*Primary Examiner* — Joseph Saunders, Jr.
(74) *Attorney, Agent, or Firm* — SNELL & WILMER L.L.P.

(57) ABSTRACT

A method for muting and unmuting a microphone is provided. The method includes providing a processor, receiving an input microphone signal, measuring the input microphone signal for a loudness level at a sampling rate, calculating a mute threshold level, checking if the loudness level is higher than or equal to the mute threshold level, and resetting a mute delay timer upon determining that the loudness level is higher than or equal to the mute threshold level and obtaining the input microphone signal, or checking if the mute delay timer is running upon determining that the loudness level is not higher than or equal to the mute threshold level and attenuating the input microphone signal if the mute delay timer is not running or obtaining the input microphone signal if the mute delay timer is still running, and writing the input microphone signal or attenuated input microphone signal to an output buffer.

16 Claims, 1 Drawing Sheet

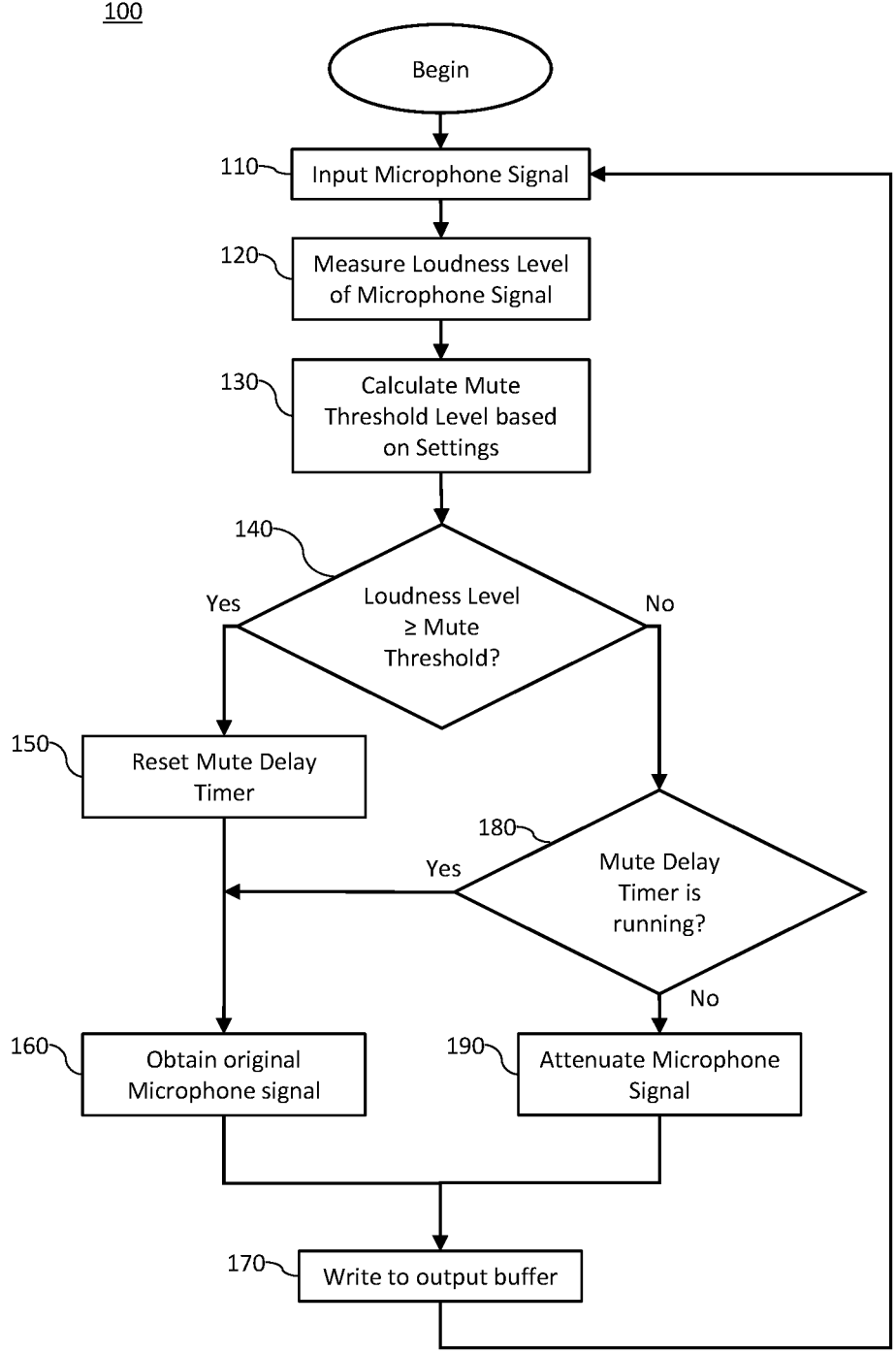

METHOD TO MUTE AND UNMUTE A MICROPHONE SIGNAL

CROSS REFERENCES TO RELATED APPLICATIONS

This application claims the benefit of provisional U.S. Patent Application: 63/131,424, filed 29 Dec. 2020, and titled, "METHOD TO MUTE AND UNMUTE A MICROPHONE SIGNAL," the disclosure of which is incorporated herein by reference in its entirety.

TECHNICAL FIELD

The present invention generally relates to muting and unmuting of a microphone signal, and more particularly relates to muting and unmuting of a microphone signal using voice activity detector.

BACKGROUND

Microphones are used during voice or video calls such as phone calls or internet calls (with or without video, using communication software such as Zoom, Skype and Microsoft Teams). Typically, the microphones are enabled all the time during the call. However, the always enabled microphones would pick up undesired background noise, or unintended audio from the environment, resulting in disturbance to and affecting the remote parties in the call. In order to prevent this problem, typically during the call, a user would mute his microphone when he is not talking so that background sound/noise will not be heard by the other remote parties in the call. The microphone may also be muted by default so as to minimize disruption to other users. Very often, the user may forget to unmute the microphone when he starts to talk.

Thus, it can be seen that what is needed is a method to mute and unmute a microphone signal when a user is not talking and when a user is talking respectively. Furthermore, other desirable features and characteristics will become apparent from the subsequent detailed description and the appended claims, taken in conjunction with the accompanying drawings and this background of the disclosure.

SUMMARY

In one aspect of the invention, a method for muting and unmuting a microphone is provided. The method includes providing a processor, receiving an input microphone signal, measuring the input microphone signal for a loudness level at a sampling rate, calculating a mute threshold level, checking if the loudness level is higher than or equal to the mute threshold level, and resetting a mute delay timer upon determining that the loudness level is higher than or equal to the mute threshold level and obtaining the input microphone signal, or checking if the mute delay timer is running upon determining that the loudness level is not higher than or equal to the mute threshold level and attenuating the input microphone signal if the mute delay timer is not running or obtaining the input microphone signal if the mute delay timer is still running, and writing the input microphone signal or attenuated input microphone signal to an output buffer.

In another aspect of the invention, a software product that includes a non-transitory storage medium readable by a processor, the non-transitory storage medium having stored thereon a set of instructions for muting and unmuting an input microphone signal is provided. The software product includes a first sequence of instructions which, when executed by the processor, causes said processor to receive an input microphone signal, a second sequence of instructions which, when executed by the processor, causes said processor to measure the input microphone signal for a loudness level at a sampling rate, a third sequence of instructions which, when executed by the processor, causes said processor to calculate a mute threshold level, a fourth sequence of instructions which, when executed by the processor, causes said processor to check if the loudness level is higher than or equal to the mute threshold level, and reset a mute delay timer upon determining that the loudness level is higher than or equal to the mute threshold level and obtain the input microphone signal, or check if the mute delay timer is running upon determining that the loudness level is not higher than or equal to the mute threshold level and attenuate the input microphone signal if the mute delay timer is not running or obtain the input microphone signal if the mute delay timer is still running, and a fifth sequence of instructions which, when executed by the processor, causes said processor to write the input microphone signal or attenuated input microphone signal to an output buffer.

BRIEF DESCRIPTION OF THE DRAWINGS

FIG. 1 is a flow diagram depicting a method for muting and unmuting a microphone signal in accordance with various embodiments.

DETAILED DESCRIPTION OF PREFERRED EMBODIMENTS

The following detailed description is merely exemplary in nature and is not intended to limit the invention or the application and uses of the invention. Furthermore, there is no intention to be bound by any theory presented in the preceding background of the invention or the following detailed description. It is an intent of the various embodiments to present a method to mute and unmute a microphone signal.

Referring to FIG. 1, a flow diagram 100 depicting a method for muting and unmuting a microphone signal in accordance with various embodiments is shown. A device is provided with a processor. The processor receives an input microphone signal in step 110, and the loudness level of the microphone signal is measured in step 120. In one embodiment, the input microphone signal can be in the frequency domain. The band magnitude of the microphone signal from a frequency band can be measured by taking the root-mean-square (RMS) of the complex input microphone signal multiplied by a magnitude scaling factor. The frequency band can be from a lower bound frequency (e.g. 250 Hz) to an upper bound frequency (e.g. Nyquist frequency of input microphone signal or 8000 Hz, whichever is lower). The magnitude scaling factor takes into consideration the sampling rate of the audio. In one embodiment, the magnitude scaling factor can be the inverse of the square root of a function of the sampling rate and frame size. By multiplying the magnitude scaling factor, the band magnitude becomes invariant to different sampling rates and frame sizes.

The current loudness level is obtained by smoothing the band magnitude using a smoothing function with an attack response time and a release response time. Attack response is the response of how fast/slow the smoothed value will increase compared to its previous value, and release response is the response of how fast/slow the smoothed value will decrease compared to its previous value. In one embodiment, the attack response time and release response time are 16 msec. The loudness level of the microphone signal is measured in real-time, with a sample rate of 16 kHz, frame size of 512, attack response time of 16 msec and release response time of 16 msec, such that the loudness level of the microphone signal can be determined every 32 msec. Advantageously, this will allow the microphone signal to be unmuted almost instantaneous with no loss of speech as will be elaborated further on below. Other suitable sampling rates and frame sizes can also be used, depending on system resources and limitations. For example, a sample rate of 48 kHz and frame size of 512 allows the loudness level of the microphone signal to be determined every 10.67 msec.

In step 130, the processor calculates a mute threshold level based on voice activity detection (VAD) settings. In one embodiment, the mute threshold level is set based on one of five different VAD modes. The modes are auto calibration, manual calibration by presets, manual calibration by preset level, manual calibration by custom value and real-time auto adjustment. In one embodiment, the preferred mode set by default is the real-time auto adjustment mode.

When the mode is set to auto calibration, the user is requested to remain silent for a certain duration (e.g. at least 3 seconds) while audio calibration is in-progress. During auto calibration, the processor measures the peak ambience noise level and adjust the mute threshold level based on the measured level. Peak noise can be measured for every 200 ms microphone signal and stored in a circular buffer with size of 8. This is the same as taking the peak noise for the last 1.6 sec (8×200 ms), which updates every 200 ms. A button may be made available for the user to start the calibration. Although auto calibration can give a more accurate measurement of the environment sound/noise level, it requires the user to do this calibration every time a call is started.

When the mode is set to manual calibration by presets, the user is asked to choose different presets considering his voice level (e.g. loud, moderate, soft), the environment noise level (e.g. high, moderate or low background noise) and the microphone in use (e.g. headset, earbuds, frontal microphone, far-field microphone). The mute threshold level is set based on pre-defined preset values that are pre-tuned natively to correspond with the selected presets.

When the mode is set to manual calibration by preset level, the user is asked to select custom presets such as but not limited to specific microphone types and models, and environment types. For example, the user can be presented with microphone options such as "Creative Labs Live! Cam Sync HD 1080 p Webcam microphone", "Lewitt LCT 640 TS microphone", "Audio Technica AE2300 microphone", "Panasonic Dynamic microphone WM-530", etc. The user can also be presented with environment selection options such as "market", "shopping mall", "office", etc. The mute threshold level is set based on the preset level that corresponds to the selected custom presets.

When the mode is set to manual calibration by custom value, the mute threshold level is set based on the noise floor and user-defined fixed offset. A slider may be presented to the user to allow the user to adjust the offset value used for the VAD. The noise floor can be measured by tracking the minimum level of band magnitude, using a smoothing function with slow attack response and fast release response. Attack response is the response of how fast/slow the smoothed value will increase compared to its previous value, and release response is the response of how fast/slow the smoothed value will decrease compared to its previous value. In a preferred embodiment, the attack response time is 10 sec and the release response time is 50 msec.

When the mode is set to real-time auto adjustment, the mute threshold level is continuously updated in real-time. During mute condition, the mute threshold level is based on instantaneous peak noise. In a preferred embodiment, smoothing is applied using an attack response time of 1 msec and a release response time of 2000 msec. Peak noise can be measured for every 200 ms microphone signal and stored in a circular buffer with size of 8. This is the same as taking the peak noise for the last 1.6 sec (8×200 ms), which updates every 200 ms. During mute to unmute transition, the previous value of mute threshold level can be stored as a mute threshold (minimum) value. During unmute to mute transition, the circular buffer is cleared. During unmute condition, the mute threshold level is based on average loudness level. In a preferred embodiment, average loudness level is calculated by smoothing the measured band magnitude using an attack response time of 200 msec and a release response time of 200 msec. If the calculated average loudness level plus a fixed predefined offset is lower than the mute threshold (minimum) value stored, the mute threshold (minimum) value will be used. In a preferred embodiment, smoothing is applied using an attack response time of 2000 msec and a release response time of 2000 msec. Advantageously, there is no configuration setting for the user to set or select in auto adjustment mode.

In step 140, the processor checks if the loudness level is greater than or equal to the mute threshold level. When the check indicates that the loudness level is greater than or equal to the mute threshold level, the mute delay timer is reset in step 150. The mute delay timer controls when the microphone will be automatically muted (by attenuating the microphone signal) when the measured loudness level is lower than the mute threshold level. The mute delay timer is reset whenever the measured loudness level is higher than or equal to the mute threshold level in step 150. When the measured loudness level is lower than the mute threshold level, the mute delay timer will continue to run in step 180 until the timer times out. When the timer times out, the input microphone signal will be attenuated sufficiently to achieve the effect of muting the microphone in step 190. The mute delay timer setting is applicable to all the five modes, and the user would be able to set a preferred value. In one embodiment, the default value is 1 second. A mute delay of 1 seconds means that if no voice activity is detected for 1 second, the microphone will be muted. The mute delay timer advantageously allows the reduction of unnecessary momentarily muting of the microphone due to the user pausing momentarily in his speech during a call, greatly enhancing the overall experience of the call. In step 160, the original microphone signal is obtained, and written to an output buffer in step 170, before reverting to step 110. When the original microphone signal is written to the output buffer, the effect of unmuting the microphone signal is achieved. When the microphone signal is attenuated in step 190 and written to output buffer in step 170, the effect of muting the microphone signal is achieved.

On the other hand, when the loudness level is not greater than or equal to the mute threshold level in step 140, the processor will check if the mute delay timer is running in step 180. When the check indicates that the mute delay timer is running, the process proceeds to step 160, followed by step 170. On the other hand, when the mute delay timer is not running (time out), the microphone is muted by attenuating the microphone signal in step 190, and the process proceeds to step 170, before reverting to step 110. The method in flow diagram 100 is continuously measuring the input microphone signal.

In one embodiment, a visual indicator is displayed for the user to know the current mute status. While the user is selecting and adjusting his VAD settings, the microphone signal will concurrently be analysed and mute status displayed so that the user can make changes to the VAD settings accordingly. As the ambient conditions when the user was selecting and adjusting his VAD settings may differ from the actual ambient conditions during an actual call, displaying the current mute status during the entire duration of the call allows the user to be aware of the real-time mute status and if necessary, the user can make changes to the VAD settings accordingly.

During mute condition, the microphone signal is attenuated to have the effect similar to a muted microphone. In a preferred embodiment, dynamic attenuation technique is implemented which takes into consideration the strength of the real-time microphone signal instead of applying a fixed attenuation to mute the microphone signal. When user is not talking and the microphone signal level is low (such as in the scenario whereby the background noise is low), less attenuation will be applied to achieve the target mute audio level of the microphone signal. When user is not talking and microphone signal level is high (such as in the scenario whereby the background noise level is high), more attenuation will be applied to achieve the target mute audio level of the microphone signal. The target mute audio level of the microphone signal is decided such that the level is sufficiently low enough that humans cannot hear the audio, but sufficiently high enough that communication applications can still detect the presence of the attenuated microphone signal. The attenuation level is calculated based on the target audio level of the input microphone signal during mute condition (e.g. approximately −66 dB) and current measured loudness level, with smoothing applied using an attack response time of 2000 msec and a release response time of 200 msec. Advantageously, this prevents some communication applications from thinking that there may be a problem with the user's microphone or audio system setup due to not being able to detect the presence of microphone signal during communication.

Although the steps in the flow diagram are given sequentially, it should be appreciated that some of the steps can be performed concurrently, or in a different sequence. The steps described may be implemented in hardware, software, firmware, or any combination thereof.

Thus, it can be seen that a method for muting and unmuting of a microphone signal when a user is not talking and when a user is talking respectively has been provided. An advantage of the present invention is that it provides a way for a device to mute and unmute a microphone automatically when a user is not talking and when a user is talking respectively. Advantageously, the microphone is unmuted almost instantaneous with no loss of speech.

While exemplary embodiments have been presented in the foregoing detailed description of the present embodiments, it should be appreciated that a vast number of variations exists. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A method for muting and unmuting a microphone signal, comprising:
   providing a processor;
   receiving an input microphone signal in a frequency domain;
   measuring the input microphone signal for a loudness level at a sampling rate by taking a root-mean-square of the input microphone signal multiplied by a magnitude scaling factor, wherein the magnitude scaling factor is an inverse of a square root of a function of the sampling rate and frame size;
   calculating a mute threshold level;
   checking if the loudness level is higher than or equal to the mute threshold level, and
   resetting a mute delay timer upon determining that the loudness level is higher than or equal to the mute threshold level and obtaining the input microphone signal, or checking if the mute delay timer is running upon determining that the loudness level is not higher than or equal to the mute threshold level and attenuating the input microphone signal if the mute delay timer is not running or obtaining the input microphone signal if the mute delay timer is still running; and
   writing the input microphone signal or attenuated input microphone signal to an output buffer.

2. The method of claim 1, wherein the loudness level of the input microphone signal is determined every 32 milliseconds.

3. The method of claim 1, wherein the step of calculating the mute threshold level comprises checking a voice activity detection mode and obtaining a set of parameters used for calculating the mute threshold level.

4. The method of claim 3, wherein the voice activity detection mode is selected from a group consisting of auto calibration, manual calibration by presets, manual calibration by preset level, manual calibration by custom value and real-time auto adjustment, and wherein real-time auto adjustment mode is selected by default.

5. The method of claim 1, wherein the mute delay timer is configured to 1 second.

6. The method of claim 1, further comprising a step of obtaining a preferred value for the mute delay timer of a user, and configuring the mute delay timer to the preferred value.

7. The method of claim 1, further comprising a step of displaying a visual indicator to show current mute status.

8. The method of claim 1, wherein the step of attenuating the input microphone signal comprises determining an attenuation value based on a target audio level of the input microphone signal and the loudness level, and wherein the target audio level of the input microphone signal is at an audio level that humans cannot hear the audio but communication applications can still detect the presence of the attenuated input microphone signal.

9. A software product that includes a non-transitory storage medium readable by a processor, the non-transitory storage medium having stored thereon a set of instructions for muting and unmuting an input microphone signal, comprising:
   a first sequence of instructions which, when executed by the processor, causes said processor to receive an input microphone signal in a frequency domain;

a second sequence of instructions which, when executed by the processor, causes said processor to measure the input microphone signal for a loudness level at a sampling rate by taking a root-mean-square of the input microphone signal multiplied by a magnitude scaling factor, wherein the magnitude scaling factor is an inverse of a square root of a function of the sampling rate and frame size;

a third sequence of instructions which, when executed by the processor, causes said processor to calculate a mute threshold level;

a fourth sequence of instructions which, when executed by the processor, causes said processor to check if the loudness level is higher than or equal to the mute threshold level, and reset a mute delay timer upon determining that the loudness level is higher than or equal to the mute threshold level and obtain the input microphone signal, or check if the mute delay timer is running upon determining that the loudness level is not higher than or equal to the mute threshold level and attenuate the input microphone signal if the mute delay timer is not running or obtain the input microphone signal if the mute delay timer is still running; and a fifth sequence of instructions which, when executed by the processor, causes said processor to write the input microphone signal or attenuated input microphone signal to an output buffer.

10. The software product of claim 9, wherein the loudness level of the input microphone signal is determined every 32 milliseconds.

11. The software product of claim 9, wherein the mute threshold level is calculated based on a voice activity detection mode and a set of parameters.

12. The software product of claim 11, wherein the voice activity detection mode is selected from a group consisting of auto calibration, manual calibration by presets, manual calibration by preset level, manual calibration by custom value and real-time auto adjustment, and wherein real-time auto adjustment mode is selected by default.

13. The software product of claim 9, wherein the mute delay timer is configured to 1 second.

14. The software product of claim 9, further comprising a sequence of instructions which, when executed by the processor, causes said processor to obtain a preferred value for the mute delay timer of a user, and configuring the mute delay timer to the preferred value.

15. The software product of claim 9, further comprising a sequence of instructions which, when executed by the processor, causes said processor to display a visual indicator to show current mute status.

16. The software product of claim 9, wherein the input microphone signal is attenuated by an attenuation value based on a target audio level of the input microphone signal and the loudness level, and wherein the target audio level of the input microphone signal is at an audio level that humans cannot hear the audio but communication applications can still detect the presence of the attenuated input microphone signal.

* * * * *